US007573613B2

(12) United States Patent

Takemoto et al.

(10) Patent No.: US 7,573,613 B2

(45) Date of Patent: Aug. 11, 2009

(54) METHOD AND APPARATUS FOR CONTROLLING PICTURE COLOR TONE OF PRINTING PRESS

(75) Inventors: Syuuichi Takemoto, Hiroshima-ken (JP); Ikuo Ozaki, Hiroshima-ken (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 665 days.

(21) Appl. No.: 11/295,496

(22) Filed: Dec. 7, 2005

(65) Prior Publication Data

US 2006/0092473 A1 May 4, 2006

Related U.S. Application Data

(60) Provisional application No. 60/669,011, filed on Apr. 7, 2005.

(51) Int. Cl.

*H04N 1/40* (2006.01)
*H04N 1/46* (2006.01)
*G03F 3/08* (2006.01)

(52) U.S. Cl. ...................... 358/3.01; 358/461; 358/504; 358/518

(58) Field of Classification Search .................. 358/1.9, 358/3.06, 501, 520, 3.01, 461, 504, 518; 348/186

See application file for complete search history.

(56) References Cited

U.S. PATENT DOCUMENTS 5,122,863 A * 6/1992 Zortea ........................ 348/186
5,182,721 A 1/1993 Kipphan et al.
5,508,826 A * 4/1996 Lloyd et al. ................. 358/501
5,646,752 A * 7/1997 Kohler et al. ............... 358/520
6,041,708 A 3/2000 Kipphan et al.
6,389,968 B1 * 5/2002 Sugimoto et al. ........... 101/365
7,262,880 B2 * 8/2007 Geissler et al. .............. 358/1.9

FOREIGN PATENT DOCUMENTS

| | | |
|---|---|---|
| JP | 4-221642 | 8/1992 |
| JP | 7-195675 | 8/1995 |
| JP | 8-058067 | 3/1996 |
| JP | 2-505434 | 4/1996 |
| JP | 10-173948 | 6/1998 |
| JP | 10-272761 | 10/1998 |
| JP | 11-320838 | 11/1999 |
| JP | 2000-108309 | 4/2000 |
| JP | 2001-018364 | 1/2001 |
| JP | 2001-047005 | 2/2001 |
| JP | 2001-047605 | 2/2001 |

(Continued)

*Primary Examiner*—James A Thompson

(74) *Attorney, Agent, or Firm*—Kanesaka Berner & Partners

(57) ABSTRACT

A picture color tone controlling method for a printing press is disclosed wherein color tone control can be performed using an IRGB densitometer which requires a lower cost than a spectrometer. A target mixed color halftone density for each ink supplying unit width when a printing picture is divided with an ink supplying unit width of an ink supplying apparatus (6, 7) is set. Then, an actual mixed color halftone density for each ink supplying unit width of a regular printing sheet obtained by printing is measured using an IRGB densitometer (1), and the ink supplying amount is adjusted for each ink supplying unit width so that the actual mixed color halftone density may approach the target mixed color halftone density.

19 Claims, 9 Drawing Sheets

FOREIGN PATENT DOCUMENTS

| | | |
|---|---|---|
| JP | 2001-121680 | 5/2001 |
| JP | 2001-301124 | 10/2001 |
| JP | 2002-059536 | 2/2002 |
| JP | 2002-154193 | 5/2002 |
| JP | 2002-172762 | 6/2002 |
| JP | 2002-301807 | 10/2002 |
| JP | 2003-291312 | 10/2003 |

* cited by examiner

METHOD AND APPARATUS FOR CONTROLLING PICTURE COLOR TONE OF PRINTING PRESS

BACKGROUND OF THE INVENTION

1) Field of the Invention

This invention relates to a picture color tone controlling method and apparatus for a printing press, and more particularly to a picture color tone controlling method and apparatus for controlling the color tone using an IRGB densitometer.

2) Description of the Related Art

As one of conventionally available methods of controlling the color tone of a picture of a printing press, a method is known wherein a color patch for color tone inspection is printed at a marginal portion of a printing sheet together with a picture and a spectral reflection factor of the color patch is measured using a spectrometer and then a displacement of the color tone of the picture from a target color tone based on a result of the measurement to control the ink supply amount for each color. However, since this method requires a margin for printing a color patch on a printing sheet, the paper is consumed wastefully by an amount of the margin.

In order to solve this problem, a method is proposed in Japanese Patent Laid-Open No. 2001-18364 (hereinafter referred to as Patent Document 1) or Japanese Patent Laid-Open No. 2001-47605 (hereinafter referred to as Patent Document 2) wherein picture color tone control of a picture itself is performed without using a color patch. The methods disclosed in the documents mentioned generally adopt the following procedure.

First, the spectral reflection factor of a picture printed by printing units for individual colors is measured using a spectrometer. Then, the spectral reflection factor (average spectral reflection factor of an entire key zone) is arithmetically operated for each of key zones of ink keys, and the spectral reflection factor of each key zone is converted into color coordinate value s (L*a*b*) proposed by the Commission Internationale de l'Eclairage (CIE). The ink supply amount for each color is adjusted to perform test printing, and if a printing sheet having a desired color tone (such sheet is hereinafter referred to as OK sheet) is obtained, then the color coordinate value of each key zone of the OK sheet is set to a target color coordinate value. Then, regular printing is started, and the difference (color difference) in color coordinate value between the OK sheet and a printing sheet (in the following description, a printing sheet obtained by the regular printing is referred to as regular printing sheet) is calculated for each key zone. Then, the increase/decrease amount of the opening of the ink key of each printing unit with respect to the color difference is calculated, and the opening of the ink key of each printing unit is adjusted by on-line control so that the color difference may be zero.

However, the method disclosed in Patent Document 1 or 2 has the following problems. First, according to the method described above, while a spectrometer is used as a measuring instrument, the spectrometer requires a high cost, and besides, when the object of measurement moves at a very high speed as in a rotary press for newspapers (in this instance, the object of measurement is a printing sheet), the spectrometer cannot follow up the object of measurement from the processing capacity thereof. Further, according to the method described above, since color tone control is started after an OK sheet is printed, many loss papers are produced before an OK sheet is printed after printing is started. Furthermore, according to the method described above, since the spectral reflection factor of a picture in a key zone of an ink key is averaged over the entire key zone and the color tone control is performed based on the average spectral reflection factor, where the image line rate of the picture in the key zone is low, the error in measurement of the spectrometer becomes so great that the control is liable to become less stable. Besides, although, depending upon an order of a customer, particularly strict color tone management is required for a particular noticed point in the picture, where it is intended to perform color tone control with regard to a particular noticed point in this manner, data of the PPF (Print Production Format) of the CIP3 (Cooperation for Integration of Prepress, Press, Postpress) or the like must be received as reference image data from a plate making step on the upstream.

SUMMARY OF THE INVENTION

It is a first object of the present invention to provide a picture color tone controlling method for a printing press wherein color tone control can be performed using an IRGB densitometer which requires a lower cost than a spectrometer.

It is a second object of the present invention to provide a picture color tone controlling method for a printing press wherein color tone control can be started immediately after printing is started before an OK sheet is obtained.

It is a third object of the present invention to provide a picture color tone controlling method for a printing press wherein, when color tone control of a picture is performed for each ink supply unit width, even if the image line rate of the picture in the ink supply unit width is low, stable color tone control can be performed with minimized errors in measurement of a sensor.

It is a fourth object of the present invention to provide a picture color tone controlling method for a printing press wherein color tone control can be performed with regard to a particular noticed point of a picture without the necessity for reference image data.

It is a fifth object of the present invention to provide a picture color tone controlling method for a printing press wherein, where reference image data (picture area rate data such as PPF data) can be obtained, the reference image data can be utilized effectively to perform accurate color tone control.

In order to attain the objects described above, according to the picture color tone controlling method for a printing press of the present invention, a target mixed color halftone density for each ink supplying unit width when a printing picture is divided with an ink supplying unit width of an ink supplying apparatus is set first. The ink supplying unit width of the ink supplying apparatus is, where the ink supplying apparatus is an ink key apparatus, a key width (key zone) of each ink key, and where the ink supplying apparatus is a digital pump apparatus, a pump width of each digital pump. It is to be noted that various methods are available for the setting method of the target mixed color halftone density, and a method suitable for a situation is used.

When a regular printing sheet is obtained after the printing is started, an actual mixed color halftone density for each ink supplying unit width of the regular printing sheet is measured using an IRGB densitometer. Then, based on a corresponding relationship between the halftone dot area rate of each ink color and the mixed color halftone density, an actual halftone dot area rate of each ink color corresponding to the actual mixed color density is determined. As a method of determining an actual halftone dot area rate from an actual mixed color halftone density, a database in which a relationship between the halftone dot area rate and the mixed color halftone density of each ink color, for example, a database produced by actually measuring a printed matter of the Japan Color Standards for Newspaper established by the Japan National Committee for ISO/TC130 using an IRGB densitometer, may be used. Or more simply, it is possible to utilize a value obtained by approximation with the known Neugebauer's expression making use of the database. Further, based on the corresponding relationship between the halftone dot area rate of each ink color and the mixed color halftone density, also a target halftone dot area rate of each ink color corresponding to the target mixed color halftone density is determined. Different from the actual halftone dot area rate, the target halftone dot area rate need not be determined every time, but may be determined only once unless the target mixed color halftone density changes. For example, at a point of time when the target mixed color halftone density is set, also the target halftone dot area rate may be determined.

Then, based on the corresponding relationship between the halftone dot area rate and the single color halftone density, an actual single color halftone density corresponding to the actual halftone dot area rate is determined. As a method of determining the actual single color halftone density from the actual halftone dot area rate, a map or a table representative of the relationship between the single color halftone density and the halftone dot area rate may be prepared in advance such that the actual halftone dot area rate is applied to the map or the table. Further, based on the corresponding relationship between the halftone dot area rate and the single color halftone density, also a target single color halftone density corresponding to the target halftone dot area rate is determined. Different from the actual single color halftone density, the target single color halftone density need not be determined every time, but may be determined only once unless the target halftone dot area rate changes. For example, at a point of time when the target halftone dot area rate is set, also the target single color halftone density may be determined.

Then, based on a corresponding relationship among the halftone dot area rate, the single color halftone density and the solid density set in advance, a solid density deviation corresponding to a deviation between the target single color halftone density and the actual single color halftone density under the target halftone dot area rate is determined. As a method of determining the solid density deviation, a map or a table representative of the relationship described above may be prepared in advance such that the target halftone dot area rate, the target single color halftone density and the actual single color halftone density are applied to the map or the table. Or more simply, it is possible to utilize a value obtained by approximation with the known Yule-Nielsen equation to determine the solid density deviation. Then, the ink supplying amount is adjusted for each ink supplying unit width based on the solid density deviation to control the supplying amount of the ink of each color for each ink supplying unit width. The adjustment amount of the ink supplying amount based on the solid density deviation can be determined simply using the known API (Auto Preset Inking) function which is hereinafter described in detail in connection with embodiments of the present invention.

In this manner, with the picture color tone controlling method for a printing press of the present invention, color tone control can be performed using not a spectrometer but an IRGB densitometer. Consequently, the cost required for the measurement means can be reduced, and also it is possible to sufficiently cope with a high-speed printing press such as a rotary printing press for newspapers.

It is to be noted that the picture color tone controlling method described above can be carried out by a picture color tone controlling apparatus having the following configuration. In particular, the picture color tone controlling apparatus for a printing press of the present invention comprises, as components thereof, an ink supplying apparatus for supplying ink to each of regions divided in a printing widthwise direction, and an IRGB densitometer (preferably a line sensor type IRGB densitometer) disposed on a traveling line of a regular printing sheet obtained by printing. The picture color tone controlling apparatus for a printing press further comprises, as components thereof, target mixed color halftone density setting means, mixed color halftone density measurement means, target halftone dot area rate arithmetic operation means, actual halftone dot area rate arithmetic operation means, target single color halftone density arithmetic operation means, actual single color halftone density arithmetic operation means, solid density deviation arithmetic operation means, and ink supplying amount adjustment means.

Among the components mentioned above, the target mixed color halftone density setting means, mixed color halftone density measurement means, target halftone dot area rate arithmetic operation means, actual halftone dot area rate arithmetic operation means, target single color halftone density arithmetic operation means, actual single color halftone density arithmetic operation means, solid density deviation arithmetic operation means, and ink supplying amount adjustment means can be implemented as programmed functions of a computer. The functions are described individually. First, the target mixed color halftone density setting means has a function of setting a target mixed color halftone density for each ink supplying unit width when a printing picture is divided with the ink supplying unit width of the ink supplying apparatus. The mixed color halftone density measurement means has a function of operating the IRGB densitometer to measure an actual mixed color halftone density for each ink supplying unit width of the regular printing sheet. The target halftone dot area rate arithmetic operation means has a function of determining, based on a corresponding relationship (for example, the Neugebauer's expression) between the halftone dot area rate of each ink color and the mixed color halftone density set in advance, a target halftone dot area rate of each ink color corresponding to the target mixed color halftone density. The actual halftone dot area rate arithmetic operation means has a function of determining, based on the same corresponding relationship, an actual halftone dot area rate of each ink color corresponding to the actual mixed color density. The target single color halftone density arithmetic operation means has a function of determining, based on a corresponding relationship between the halftone dot area rate and the single color halftone density set in advance, a target single color halftone density corresponding to the target halftone dot area rate. The actual single color halftone density arithmetic operation means has a function of determining, based on the same corresponding relationship, an actual single color halftone density corresponding to the actual halftone dot area rate. The solid density deviation arithmetic operation means has a function of determining, based on a corresponding relationship (for example, the Yule-Nielsen equation) among the halftone dot area rate, the single color halftone density and the solid density set in advance, a solid density deviation corresponding to a deviation between the target single color halftone density and the actual single color halftone density under the target halftone dot area rate. Then, the ink supplying amount adjustment means has a function of adjusting the ink supplying amount of the ink supplying apparatus for each ink supplying unit width, for example, in accordance with the API function based on the solid density deviation. It is to be noted that preferably the picture color tone controlling apparatus for a printing press further comprises a conversion table which defines a corresponding relationship among the halftone dot area rate, the mixed color halftone density and the color coordinate value in the IRGB densitometer, and the target halftone dot area rate arithmetic operation means and the actual halftone dot area rate arithmetic operation means use the conversion table to determine the target halftone area rate or the actual halftone dot area rate.

According to one of methods of setting the target mixed color halftone density, for a period of time until an OK sheet is obtained after printing is started, a mixed color halftone density corresponding to an image line rate for each ink supplying unit width of each ink color in the current printing picture is determined based on the corresponding relationship between the halftone dot area rate of each ink color and the mixed color halftone density, and the mixed color halftone density corresponding to the image line rate is set as the target mixed color halftone density. Consequently, the color tone control can be carried out after a point of time immediately after the printing is started, and the time required before an OK sheet is obtained can be reduced to reduce the paper loss. As the image line rate for each ink supplying unit width, a value obtained by measurement of a film produced in advance by a plate making step using a filter scanner or by measurement of a printing plate by means of a plate scanner. However, even if printing pictures have the same image line rate, where the dot gain (increase of the area of a halftone dot) is taken into consideration, the density values differ depending upon the density (50% plain halftone, 80% plain halftone, solid density and so forth) of the halftones which form the printing picture. Therefore, when the mixed color halftone density corresponding to the image line rate is to be determined, preferably correction is performed taking the dot gain into consideration in accordance with the density of the halftones.

On the other hand, if an OK sheet which satisfies a printing quality is obtained, then in order to enhance the color tone controlling performance of a low image line rate portion of a printed matter or a picture position which attracts attention of the human being, preferably a noticed pixel corresponding to each color is set for each ink supplying unit width from among pixels which form the picture of the OK sheet and the mixed color halftone density of the noticed pixel is set as the target mixed color halftone density. In this instance, at the step of measuring an actual mixed color halftone density, the actual mixed color halftone density of the noticed pixel is measured. Although, where pixel area rate data are not available, it is usually impossible to estimate the single color solid density of a pixel, the method described makes this possible, and according to the method, if information of the image line rate for each ink supplying unit width is available, then the color tone control can be performed also for a particular noticed point of the picture. Further, since measurement values are not averaged over the ink supplying unit width, even if the image line rate of the picture in an ink supplying unit width is low (for example, even with such a picture as a corporate color of one point), the error in measurement of the sensor (IRGB densitometer) is little and stabilized color tone control can be performed. It is to be noted here that the noticed pixel here may be one pixel or a group of a plurality of contiguous pixels. Where the noticed pixel is a plurality of pixels, the target mixed color halftone density and the actual mixed color halftone density are given as a target value and an actual measurement value of an average mixed color halftone density of the plurality of pixels.

In this manner, according to the color tone controlling method of the present invention, even if reference image data are not available, color tone control for each noticed pixel is possible. However, where it is possible to acquire kcmy halftone dot area rate data (for example, image data for plate making or the like) of a printing object picture can be acquired from the outside (for example, a printing requesting source or the like), a noticed pixel corresponding to each ink color for each ink supplying unit width is set from among pixels which form the printing object picture, and the halftone dot area rate of the noticed pixel is converted into a mixed color halftone density based on a corresponding relationship between the halftone dot area rate and the mixed color halftone density set in advance. Then, the mixed color halftone density of the noticed pixel is set as the target mixed color halftone density, and the actual mixed color halftone density of the thus set noticed pixel is measured. With the configuration described, since it is possible to estimate color development in a unit of a pixel by utilizing the Japan Color database or the like, color tone control of a particular noticed point of a picture can be performed after a point of time immediately after starting of printing without the necessity to wait that an OK sheet is printed. It is to be noted that the kcmy halftone dot area rate data may be in the form of bit map data (for example, 1-bit Tiff plate making data) of the printing object picture or low resolution data corresponding to CIP3 data obtained by conversion of such bit map data.

Further, where also an ICC (International Color Consortium) profile of a printing object picture can be acquired in addition to the kcmy halftone dot area rate data, a noticed pixel corresponding to each ink color is set for each ink supplying unit width from among pixels which form the printing object picture, and the halftone dot area rate of the noticed pixel is converted into a mixed color halftone density using the ICC profile and a device profile of the IRGB densitometer. Then, the mixed color halftone density of the noticed pixel is set as the target mixed color halftone density and the actual mixed color halftone density of the thus set noticed pixel is measured. Where the color tone is controlled based on the ICC profile obtained from the printing requesting source or the like in this manner, a printed matter of the color tone desired by the printing requesting source or the like can be obtained readily.

It is to be noted that, in order to convert the halftone dot area rate of a noticed pixel into the mixed color halftone density, the halftone dot area rate is converted once into color coordinate value using an ICC profile, and the color coordinate value are converted into the mixed color halftone density. However, since the mixed color halftone density is four-dimensional information while the color coordinate value is three-dimensional information, the mixed color halftone density corresponding to the color coordinate value is not decided uniquely. Therefore, the present invention provides a method of selecting the most appropriate piece of four-dimensional information from among a very great number of pieces of four-dimensional information which are regarded as candidates in such expansion from three-dimensional information into four-dimensional information as just described. First, as a premise, the device profile of the IRGB densitometer is provided as a conversion table which defines a corresponding relationship among the halftone dot area rate, the mixed color halftone density and the color coordinate value in the IRGB densitometer. Then, the halftone dot area rate of the noticed pixel is converted into a color coordinate value using the ICC profile, and a plurality of mixed color halftone density candidates corresponding to the color coordinate value of the noticed pixel are determined using the conversion table and the halftone dot area rate of the noticed pixel is converted into a color coordinate value using the conversion table. Then, a color difference between the two color coordinate values obtained by the conversion based on the ICC profile and the conversion based on the conversion table is determined, and a variation amount of the halftone dot area rate corresponding to the color difference is determined using mathematical means such as the minimum approximation. Then, an imaginary halftone dot area rate is obtained by adding the determined variation amount to the halftone dot area rate of the noticed pixel, and the conversion table is referred to to select that one of the plurality of mixed color halftone density candidates which corresponds most to the imaginary halftone dot area rate. Then, the selected mixed color halftone density candidate is set as the mixed color halftone density of the noticed pixel. In this manner, according to the present method, the mixed color halftone density corresponding to the color coordinate value can be determined uniquely by utilizing the halftone dot area rate corresponding to the color coordinate value.

More preferably, an actual color coordinate value corresponding to the actual mixed color halftone density of the noticed pixel measured by the IRGB densitometer and a target color coordinate value corresponding to the target mixed color halftone density are determined based on a corresponding relationship between the mixed color halftone density and the color coordinate value determined in advance. Then, a color difference between the actual color coordinate value and the target color coordinate value is determined, and the actual color coordinate value and/or the color difference are displayed on a display apparatus. With the configuration, it is possible to allow the operator to recognize intuitively by what level the color coincides.

As one of methods of setting a noticed point, a method is available wherein an image of a printing picture is displayed on a display apparatus such as a touch panel to allow the operator to designate a noticed point arbitrarily. Preferably, a pixel which has the highest density sensitivity or a pixel which has the highest autocorrelation to the halftone dot area rate is arithmetically operated and automatically extracted as the noticed pixel for each ink color. With the configuration, where the image line rate of a color or a picture of a commodity with regard to which priority is to be provided to the color tone in an ink supplying unit width is low, further stabilized color tone control can be achieved.

More preferably, a pixel group including a designated or automatically extracted pixel and a plurality of pixels around the pixel is set as the noticed pixel. In this instance, an average mixed color halftone density of the pixel group is set as the target mixed color halftone density, and an actual average mixed color halftone density of the pixel group is measured by the IRGB densitometer. The number or the selection pattern of such pixels to be included in the pixel group is determined so that an influence of disturbance may be suppressed taking the position and so forth of the designated or automatically extracted pixel in the picture into consideration. With the configuration, since the variation of measurement data caused by meandering or displacement of the printing page decreases, stabilized feedback control can be anticipated.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

In the following, embodiments of the present invention are described with reference to the drawings.

A. First Embodiment

Figure 1:
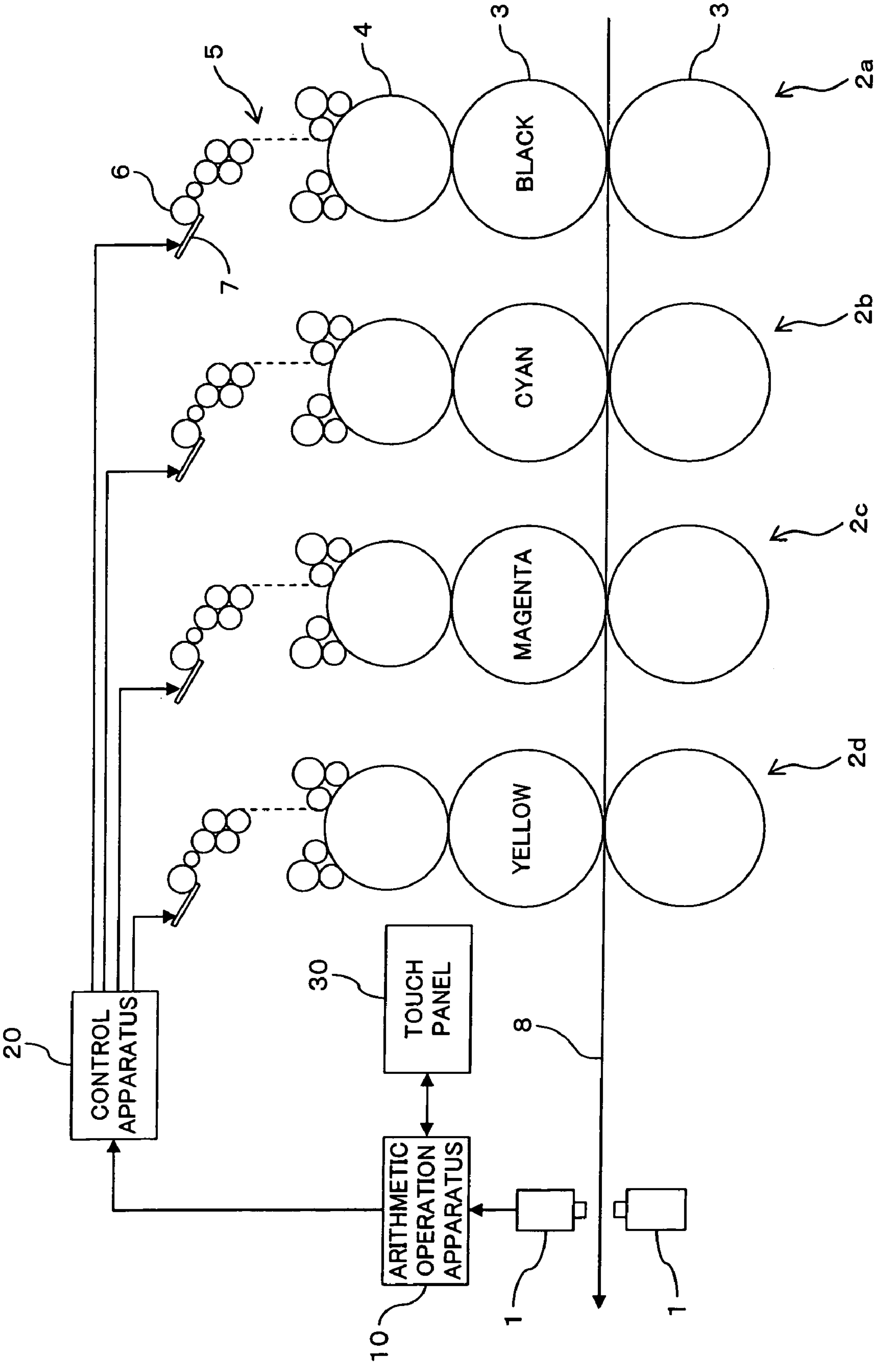
FIG. 1 is a schematic view showing a general configuration of an offset rotary press for newspapers according to a first embodiment of the present invention.

FIG. 1 shows a general configuration of an offset rotary press for news papers according to a first embodiment of the present invention. Referring to FIG. 1, the offset rotary press for newspapers of the present embodiment is a double-sided printing press for multi-color printing and includes printing units 2*a*, 2*b*, 2*c* and 2*d* installed for individual ink colors [black (k), cyan (c), magenta (m) and yellow (y)] along a transport path of a printing sheet 8. In the present embodiment, each of the printing units 2*a*, 2*b*, 2*c* and 2*d* includes an ink supplying apparatus of the ink key type including an ink key 7 and an ink source roller 6. In the ink supplying apparatus of the type described, the ink supplying amount can be adjusted by a gap amount (hereinafter referred to as ink key opening) of the ink key 7 from the ink source roller 6. Further, a plurality of ink keys 7 are juxtaposed in a printing widthwise direction, and the ink supplying amount can be adjusted in a unit of the width of the ink key 7 (the ink supplying unit width by the ink key 7 is hereinafter referred to as key zone). Ink whose supplying amount is adjusted by the ink key 7 is milled suitably in an ink roller group 5 until a thin film is formed, and the thin film of the ink is supplied to a printing plate of a printing cylinder 4. Then, the ink sticking to the printing plate is transferred as a picture to the printing sheet 8 through a blanket cylinder 3. It is to be noted that, since the offset rotary press for newspapers according to the present embodiment is for double-sided printing, though not shown in FIG. 1, each of the printing units 2*a*, 2*b*, 2*c* and 2*d* includes a pair of blanket cylinders 3 disposed on the opposite sides of the transport path of the printing sheet 8, and the printing cylinder 4 and the ink supplying apparatus are provided for each of the blanket cylinders 3.

The offset rotary press for newspapers according to the present embodiment includes a line sensor type IRGB densitometer 1 provided on the downstream side of the printing unit 2*d* positioned on the most downstream side. The line sensor type IRGB densitometer 1 is a measuring instrument which measures the color of a picture on the printing sheet 8 as reflection densities (mixed color halftone densities) of I (infrared rays), R (red), G (green) and B (blue) along a line in the printing widthwise direction. The line sensor type IRGB densitometer 1 can measure the reflection densities over the overall printing sheet 8 and measure the reflection densities at an arbitrary position. Since the offset rotary press for newspapers according to the present embodiment is for double-sided printing, such line sensor type IRGB densitometers 1 as described above are disposed on the opposite front and rear face sides of the printing sheet 8 across the transport path of the printing sheet 8 so that they can measure the reflection densities of the opposite front and rear faces of the printing sheet 8.

Figure 2:
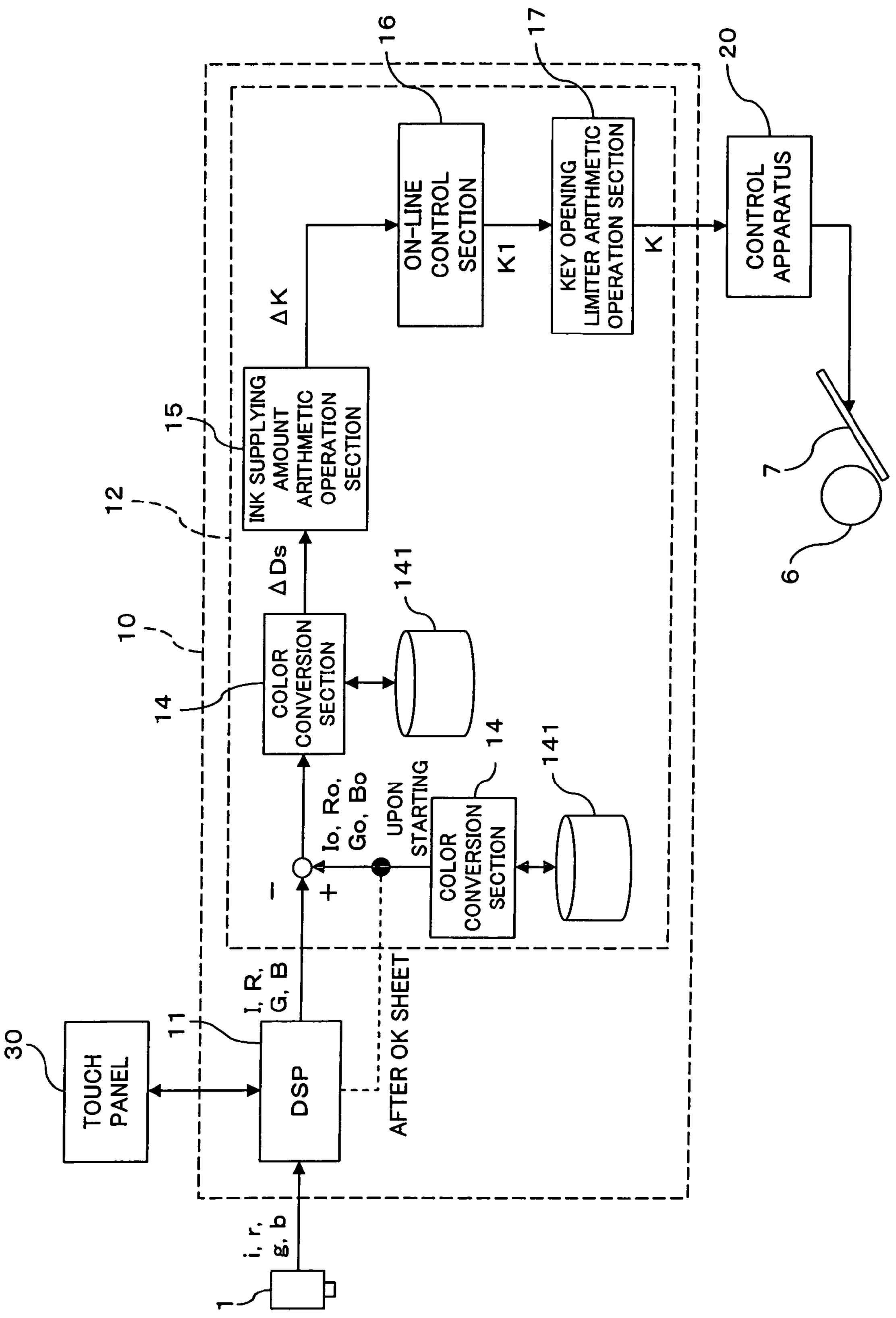
FIG. 2 is a functional block diagram showing a color tone controlling function of an arithmetic operation apparatus shown in FIG. 1.

The reflection densities measured by each of the line sensor type IRGB densitometers 1 are transmitted to an arithmetic operation apparatus 10. The arithmetic operation apparatus 10 is an apparatus for arithmetically operating control data of the ink supply amounts, and performs arithmetically operation based on the reflection densities measured by the line sensor type IRGB densitometer 1 to arithmetically operate the openings of the ink keys 7 for making the color of the picture of the printing sheet 8 coincide with a target color. FIG. 2 is a view showing a general configuration of a picture color tone control apparatus for the offset rotary press for newspapers according to the embodiment of the present invention and simultaneously is a functional block diagram showing a color tone controlling function of the arithmetic operation apparatus 10.

Referring to FIG. 2, the arithmetic operation apparatus 10 includes a digital signal processor (hereinafter referred to simply as DSP) 11 disposed in a spaced relationship from the printing press and a personal computer (hereinafter referred to simply as PC) 12. The PC 12 has functions as a color conversion section 14, an ink supplying amount arithmetic operation section 15, an on-line control section 16 and a key opening limiter arithmetic operation section 17 allocated thereto. The line sensor type IRGB densitometer 1 is connected to the input side of the arithmetic operation apparatus 10, and a control apparatus 20 built in the printing press is connected to the output side of the arithmetic operation apparatus 10. The control apparatus 20 functions as an ink supplying amount adjustment means for adjusting the ink supplying amount for each of the key zones of the ink keys 7 and controls an opening/closing apparatus not shown for opening and closing the ink key 7. The key openings can be adjusted independently of each other for each of the printing units 2*a,* 2*b,* 2*c* and 2*d*. Further, a touch panel 30 serving as a display apparatus is connected to the arithmetic operation apparatus 10. A printing page of the printing sheet 8 whose image is picked up by the line sensor type IRGB densitometer 1 is displayed on the touch panel 30 such that an arbitrary region on the printing page can be selected with a finger.

Figure 3:
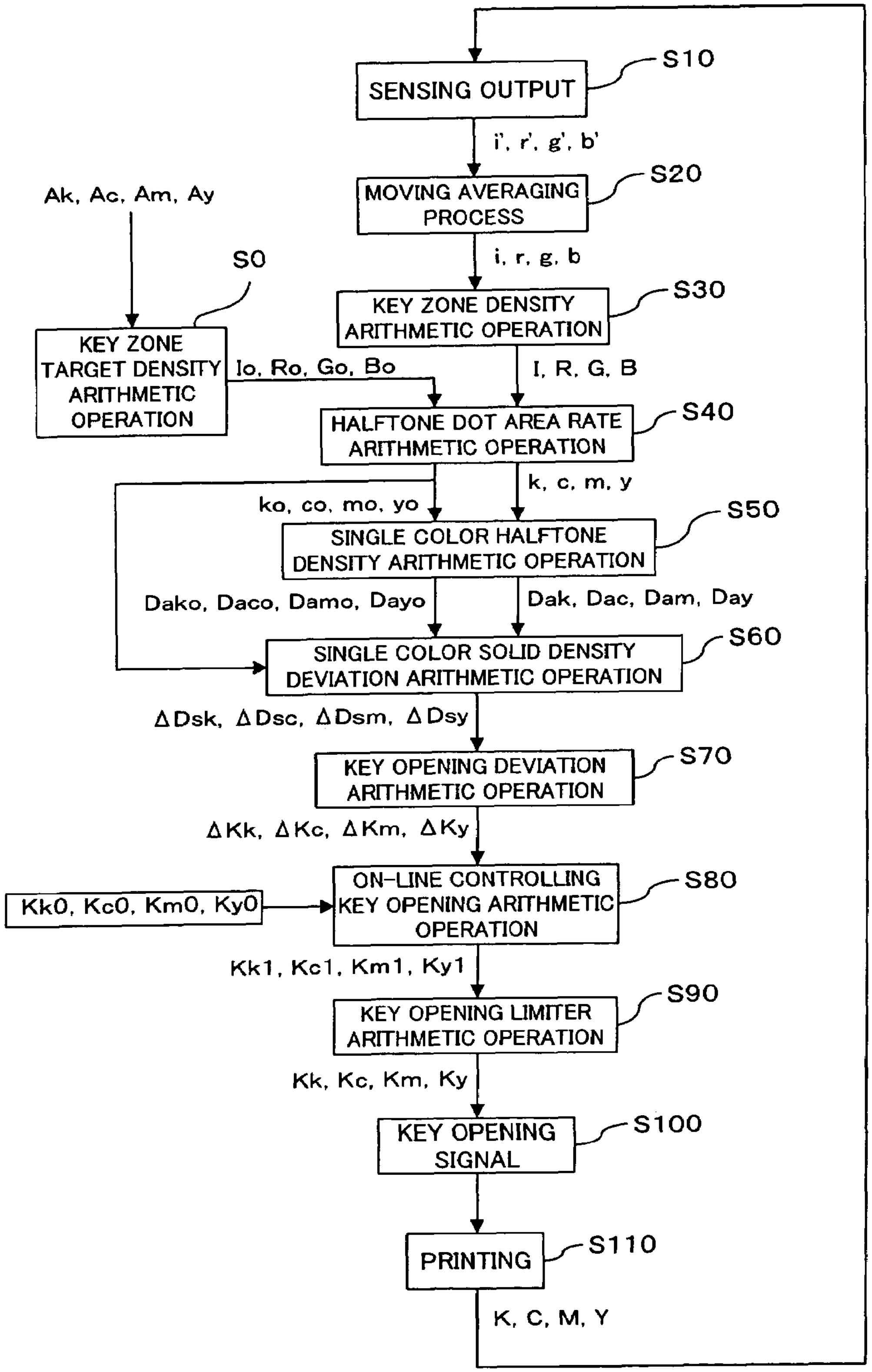
FIG. 3 is a flow chart illustrating a processing flow of color tone control by the arithmetic operation apparatus shown in FIG. 1 upon starting of printing.
Figure 4:
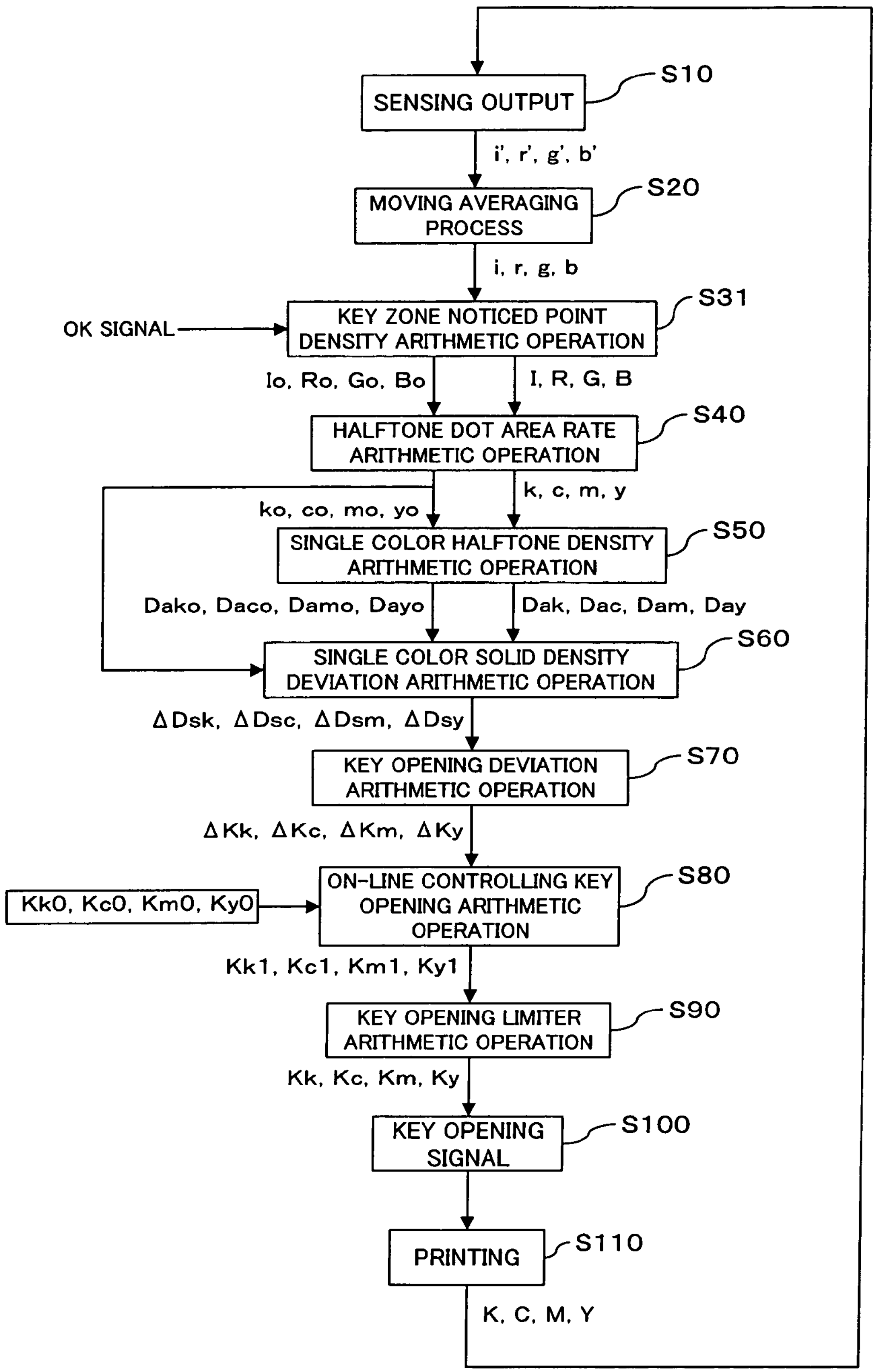
FIG. 4 is a flow chart illustrating a processing flow of color tone control by the arithmetic operation apparatus shown in FIG. 1 after an OK sheet is printed.

FIGS. 3 and 4 illustrate processing flows of color tone control by the arithmetic operation apparatus 10. In the following, contents of processing for the color tone control by the arithmetic operation apparatus 10 are described principally with reference to FIGS. 3 and 4. First, the color tone control when the printing press is started, that is, upon starting of printing, is described with reference to FIG. 3.

If pixel area rate data such as CIP3 data are not available, then in order to perform color tone control from the time at which the printing press is started, it is necessary to determine some target value for feedback control. In the present embodiment, since the line sensor type IRGB densitometer 1 is used to measure the reflection density, that is, the mixed color halftone density, a target mixed color halftone density is set as a target value in accordance with the following procedure at step S0.

First, data of image line rates Ak, Ac, Am and Ay for each key zone for each ink color of a printing picture to be printed in the current cycle are inputted to the PC 12. The data of the image line rates Ak, Ac, Am and Ay can be obtained by measuring a film for plate making by means of a film scanner or by measuring a printing plate by means of a plate scanner. The color conversion section 14 of the PC 12 includes a database 141 for associating the halftone dot area rates of the individual ink colors and the mixed color halftone densities with each other. The database 141 is produced with reference to data [a conversion table which defines a corresponding relationship among the halftone dot area rates (k, c, m, y), mixed color halftone densities (I, R, G, B) and color coordinate values (L, a, b)] obtained by actually measuring a printed matter of the Japan Color Standards for Newspaper established by the Japan National Committee for ISO/TC130 using an IRGB densitometer. The color conversion section 14 uses the database 141 to determine mixed color halftone densities corresponding to the inputted image line rates Ak, Ac, Am, Ay for each key zone and sets resulting values as target mixed color halftone densities Io, Ro, Go, Bo.

It is to be noted that, even if printing pictures have the same image line-rates Ak, Ac, Am, Ay, where the dot gain is taken into consideration, the density values of the developed colors differ depending upon the density (50% plain halftone, 80% plain halftone, solid density and so forth) of the halftones which form the printing picture. Therefore, the color conversion section 14 makes it possible to vary the dot gain for each halftone density and uses a parameter determined using the dot gain as a function as a parameter to be used to convert the image line rates Ak, Ac, Am, Ay into target mixed color halftone densities Io, Ro, Go, Bo, respectively. Consequently, the color conversion section 14 can set the target mixed color halftone densities Io, Ro, Go, Bo taking the dot gain into consideration.

After the target mixed color halftone densities Io, Ro, Go, Bo are set in such a manner as described above, printing is started and processes at step S10 et seq. are executed repetitively. First, at step S10, the line sensor type IRGB densitometer 1 measures reflection light amounts i', r', g', b' over the overall printing sheet 8 for each one pixel. The reflection light amounts i', r', g', b' measured by the IRGB densitometer 1 are inputted to the DSP 11.

Then at step S20, the DSP 11 arithmetically operates moving averages of the reflection light amounts i', r', g', b' of the pixels in a unit of a predetermined number of prints to calculate reflection light amounts i, r, g, b of the pixels from which noise components are removed. Then at step S30, the DSP 11 performs an averaging process of the reflection light amounts i, r, g, b for each key zone to arithmetically operate mixed color halftone densities (actual mixed color halftone densities) I, R, G, B with reference to the reflection light amount at a blank portion of the printing sheet 8. For example, where the reflection light amount of infrared rays at a blank portion of the printing sheet 8 is represented by ip and the average reflection light amount of infrared rays in a key zone is represented by ik, the actual mixed color halftone density I of infrared rays can be determined by $I=\log_{10}(ip/ik)$. The mixed color halftone densities I, R, G, B for each key zone arithmetically operated by the DSP 11 are inputted to the color conversion section 14 of the PC 12.

The color conversion section 14 performs processes at steps S40, S50 and S60. First at step S40, the color conversion section 14 arithmetically operates the halftone dot area rates of the ink colors corresponding to the target mixed color halftone densities Io, Ro, Go, Bo set at step S0 and the actual mixed color halftone densities I, R, G, B arithmetically operated at step S30. For the arithmetically operation at step S40, the color conversion section 14 uses the database 141 to arithmetically operate, based on the corresponding relationship stored in the database 141, the halftone dot area rates of the ink colors corresponding to the target mixed color halftone densities Io, Ro, Go, Bo as target halftone dot area rates ko, co, mo, yo. Further, the color conversion section 14 arithmetically operates the halftone dot area rates of the ink colors corresponding to the mixed color halftone densities I, R, G, B as actual halftone dot area rates k, c, m, y.

Figure 5:
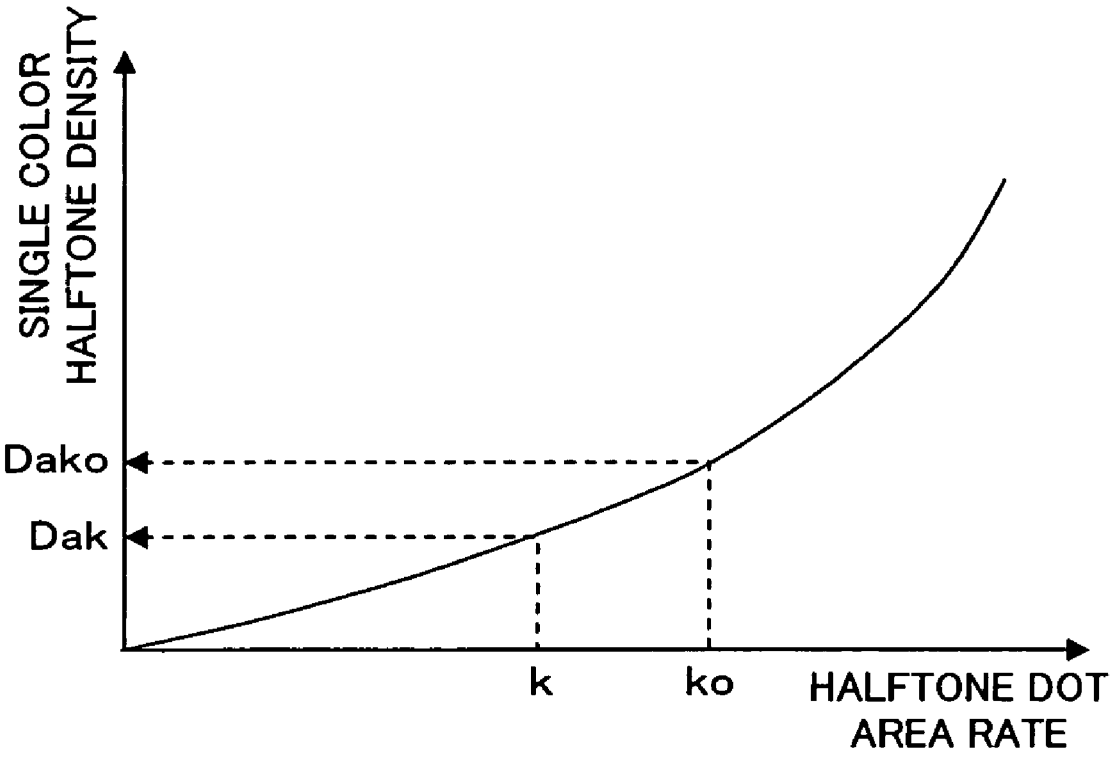
FIG. 5 is a map for coordinating the single color halftone density with the halftone dot area rate.

Then at step S50, the color conversion section 14 arithmetically operates the single color halftone densities of the ink colors corresponding to the target halftone dot area rates ko, co, mo, yo and the actual halftone dot area rates k, c, m, y. For the arithmetic operation, such a map as illustrated in FIG. 5 is used. FIG. 5 illustrates an example of a map obtained by plotting single color halftone densities actually measured where the halftone dot area rate is varied as a characteristic curve. In the example illustrated in FIG. 5, by collating the target halftone dot area rate ko and the actual halftone dot area rate k of the black color with the map, a target single color halftone density Dako and an actual single color halftone density Dak are determined from the characteristic curve in the map. The color conversion section 14 determines target single color halftone densities Dako, Daco, Damo, Dayo and actual single color halftone densities Dak, Dac, Dam, Day of the ink colors in this manner.

Figure 6:
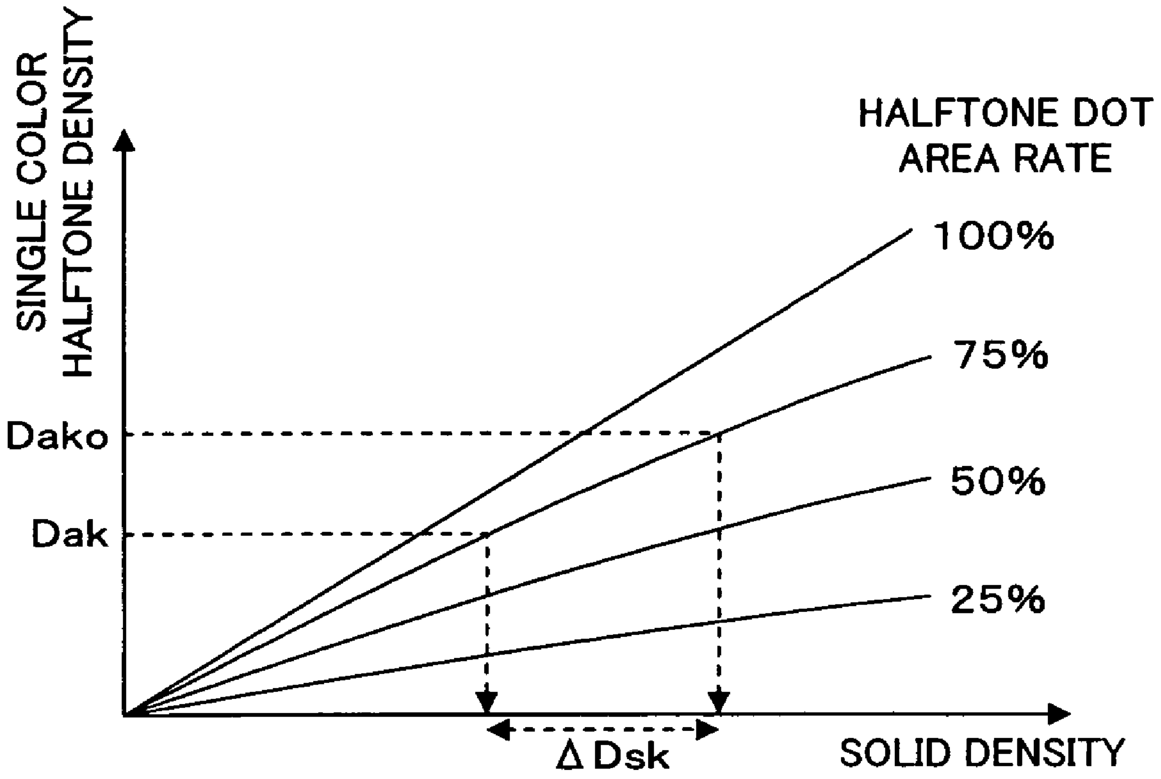
FIG. 6 is a map for coordinating the solid density with the halftone dot area rate and the single color halftone density.

Then at step S60, the color conversion section 14 arithmetically operates solid density deviations ΔDsk, ΔDsc, ΔDsm, ΔDsy of the ink colors corresponding to the deviations between the target single color halftone densities Dako, Daco, Damo, Dayo and the actual single color halftone densities Dak, Dac, Dam, Day. It is to be noted that the solid density relies also upon the halftone dot area rate, and for the same single color halftone density, the solid density decreases as the halftone dot area rate increases. Therefore, the color conversion section 14 uses such a map as illustrated in FIG. 6 to perform the arithmetic operation. FIG. 6 illustrates an example of a map obtained by plotting single color halftone densities actually measured where the single color solid density is varied as a characteristic curve for each halftone dot area rate, and is produced from data measured in advance. The color conversion section 14 selects a characteristic curve corresponding to the target halftone dot area rates ko, co, mo, yo for the ink colors from within the map illustrated in FIG. 6, and collates the target single color halftone densities Dako, Daco, Damo, Dayo and the actual single color halftone densities Dak, Dac, Dam, Day with the selected characteristic curve to determine solid density deviations ΔDsk, ΔDsc, ΔDsm, ΔDsy. In the example illustrated in FIG. 6, where the target halftone dot area rate ko of the black color is 75%, the target single color halftone density Dako and the actual single color halftone density Dak are collated with the map to determine the solid density deviation ΔDsk from the 75% characteristic curve in the map.

The solid density deviations ΔDsk, ΔDsc, ΔDsm, ΔDsy of the ink colors arithmetically operated by the color conversion section 14 are inputted to the ink supplying amount arithmetic operation section 15. At step S70, the ink supplying amount arithmetic operation section 15 arithmetically operates key opening deviation amounts ΔKk, ΔKc, ΔKm, ΔKy corresponding to the solid density deviations ΔDsk, ΔDsc, ΔDsm, ΔDsy, respectively. The key opening deviation amounts ΔKk, ΔKc, ΔKm, ΔKy are increasing or decreasing amounts with respect to the key opening deviation amounts ΔKk, ΔKc, ΔKm, ΔKy at present of the ink keys 7 (key openings Kk, Kc, Km, Ky outputted to the control apparatus 20 of the printing press by the process at step S100 in the preceding cycle), and the ink supplying amount arithmetic operation section 15 uses a known API function (auto preset inking function) to perform the arithmetic operation. The API function indicates a corresponding relationship between the image line rates A (Ak, Ac, Am, Ay) and the key openings K (Kk, Kc, Km, Ky) of the key zones in order to obtain a reference density. For the image line factors A, those used at step S0 can be used. More particularly, the ink supplying amount arithmetic operation section 15 determines the ratio kd (kd=ΔDs/Ds) of the solid density deviation ΔDs (ΔDsk, ΔDsc, ΔDsm, ΔDsy) to the reference density Ds (Dsk, Dsc, Dsm, Dsy) and determines the key opening K for obtaining a reference density with respect to the image line rate A using the API function. Then, the ink supplying amount arithmetic operation section 15 determines the key opening deviation amount ΔK (ΔK=kd× K) for setting the solid density deviation ΔDs to zero as the product of the ratio kd and the key opening K.

Then at step S80, the on-line control section 16 corrects the key opening deviation amounts ΔKk, ΔKc, ΔKm, ΔKy arithmetically operated by the color conversion section 14 taking wasteful times from the printing units 2*a*, 2*b*, 2*c* and 2*d* to the line sensor type IRGB densitometer 1, reaction times of the ink keys 7 per unit time and the printing speed into consideration. The correction is performed in order to take time delays until the variations of the ink amounts supplied to the printing sheet as a result of change of the key openings by operation of the ink keys 7 are detected as variations of the reflection light amounts by the line sensor type IRGB densitometer 1 after the key opening signals are inputted into consideration. For an on-line feedback control system which involves a comparatively long wasteful period of time in this manner, for example, PI control with wasteful time compensation, fuzzy control, robust control and so forth are applied optimally. The on-line control section 16 adds key openings Kk0, Kc0, Km0, Ky0 at present to the key opening deviation amounts (on-line controlling key opening deviation amounts) ΔKk, ΔKc, ΔKm, ΔKy after the correction and inputs resulting on-line controlling key openings Kk1, Kc1, Km1, Ky1 to the key opening limiter arithmetic operation section 17.

At step S90, the key opening limiter arithmetic operation section 17 performs correction to restrict the on-line controlling key openings Kk1, Kc1, Km1, Ky1 arithmetically operated by the on-line control section 16 to an upper limit value. This is a process for restricting any key opening from being increased abnormally by the estimation error of the color conversion algorithm (the processes at steps S40, S50 and S60) particularly at a low image line rate portion. Then, at step S100, the key opening limiter arithmetic operation section 17 transmits the key openings Kk, Kc, Km, Ky restricted with the upper limit value as key opening signals to the control apparatus 20 of the printing press.

At step S110, the control apparatus 20 of the printing press adjusts the openings of the ink keys 7 of the printing units 2*a*, 2*b*, 2*c*, 2*d* based on the key opening signals Kk, Kc, Km, Ky transmitted thereto from the arithmetic operation apparatus 10, respectively. Consequently, the ink supplying amounts of the ink colors are controlled so as to conform to a target color tone for each of the key zones.

In this manner, with the color tone controlling method according to the present embodiment, since color tone control can be started at a point of time immediately after the printing press is started as described above, the time required before an OK sheet is obtained can be reduced. Then, after an OK sheet is obtained, the color tone control in accordance with the flow chart of FIG. 4 is performed. In the following, the color tone control after an OK sheet is obtained is described with reference to FIG. 4.

Contents of the arithmetic operation processes for arithmetically operating the mixed color halftone densities for each key zone before and after an OK sheet is obtained are different from each other. In particular, after an OK sheet is obtained, a process at step S31 is executed in place the process at step S0 and the process at step S30 before an OK sheet is obtained as seen in FIG. 4.

In particular, at step S31, the DSP 11 sets target mixed color halftone densities Io, Ro, Go, Bo with regard to particular noticed points (noticed pixels) in the OK sheet and arithmetically operates actual mixed color halftone densities I, R, G, B of the noticed points using the reflection light amounts i, r, g, b of the pixels arithmetically operated at step S20. The DSP 11 is connected to the touch panel 30, and a picture image of the OK sheet is displayed on the touch panel 30. The noticed points are designated through arbitrary selection of a particular point on the OK sheet displayed on the touch panel 30 and are inputted to the DSP 11 of the arithmetic operation apparatus 10. Each noticed point is a position of the picture on the printing sheet 8 particularly with regard to which coincidence in color is to be established, and a particular one pixel or a set of a plurality of contiguous pixels is designated as the noticed point. For any key zone in which a noticed point is not designated by an operator, the DSP 11 automatically sets a noticed point. The automatic setting is performed by arithmetically operating and automatically extracting a pixel having the highest density sensitivity (pixel which exhibits the highest color development) for each ink color from within the distribution of the mixed color halftone density of the ink color of the entire OK sheet. For example, where the key zone picture is printed with the four colors, four noticed points (noticed colors) of black, cyan, magenta and yellow are set, and the four colors are controlled independently of each other within the key zone. Also it is possible to automatically set, for example, a color which is not involved in arbitrary picture points designated by the operator or a color having a comparatively small picture area.

The DSP 11 arithmetically operates target mixed color halftone densities Io, Ro, Go, Bo from the reflection light amounts i, r, g, b of the noticed points of the OK sheet and the reflection light amount at a blank portion of the OK sheet. The DSP 11 further arithmetically operates the actual mixed color halftone densities I, R, G, B from the reflection light amounts i, r, g, b at the noticed points of the printing sheet (regular printing sheet) 8 and the reflection light amount at the blank portion of the printing sheet 8. It is to be noted that, where a noticed point is a set of a plurality of pixels, the reflection light amounts i, r, g, b are averaged among the plurality of pixels which form the noticed point. The contents of processes at succeeding steps S40 to S110 are same as the contents of processes illustrated in the flow chart of FIG. 3 before the OK sheet is obtained, and the arithmetic operation apparatus 10 arithmetically operates the key openings of the ink keys 7 for adjusting the picture color tones of the regular printing sheet to the picture color tones of the OK sheet based on the target mixed color halftone densities Io, Ro, Go, Bo and the actual mixed color halftone densities I, R, G, B at the noticed points determined in such a manner as described above.

In this manner, with the picture color tone controlling method according to the present embodiment, if an OK sheet which satisfies a required print quality is obtained, then a noticed point corresponding to each of ink colors for each of key zones of the OK sheet is set and the mixed color halftone densities at the noticed points are set as the target mixed color halftone densities Io, Ro, Go, Bo. Further, the actual mixed color halftone densities I, R, G, B at the noticed points of a corresponding regular printing sheet are measured and used for feedback control. Consequently, even where plate making data such as 1-bit Tiff data or CIP3 PPF data are not available, color tone control can be performed for particular noticed points of the picture. Further, since the measurement values are not averaged over the entire key zone, even if the image line rate of the picture in the key zone is low (for example, even if a small picture of one point exists in the key zone), the error in measurement of the line sensor type IRGB densitometer 1 is little and stabilized color tone control can be performed. Particularly, since a pixel which exhibits the highest density sensitivity is arithmetically operated and automatically extracted and then set as a noticed pixel for each ink color, where the image line rate of the picture in the key zone is low, further stabilized color tone control can be performed. More particularly, for example, the density sensitivity Hdc of cyan can be represented by "$Hdc=R^2/(R+G+B+I)$" using the measurement density data (R, G, B, I), and the pixel which exhibits the highest value of the density sensitivity Hdc is determined as a noticed point of cyan. Similarly, also with regard to any other ink color, a pixel which exhibits the highest density sensitivity is arithmetically operated and set as a noticed point.

B. Second Embodiment

Figure 7:
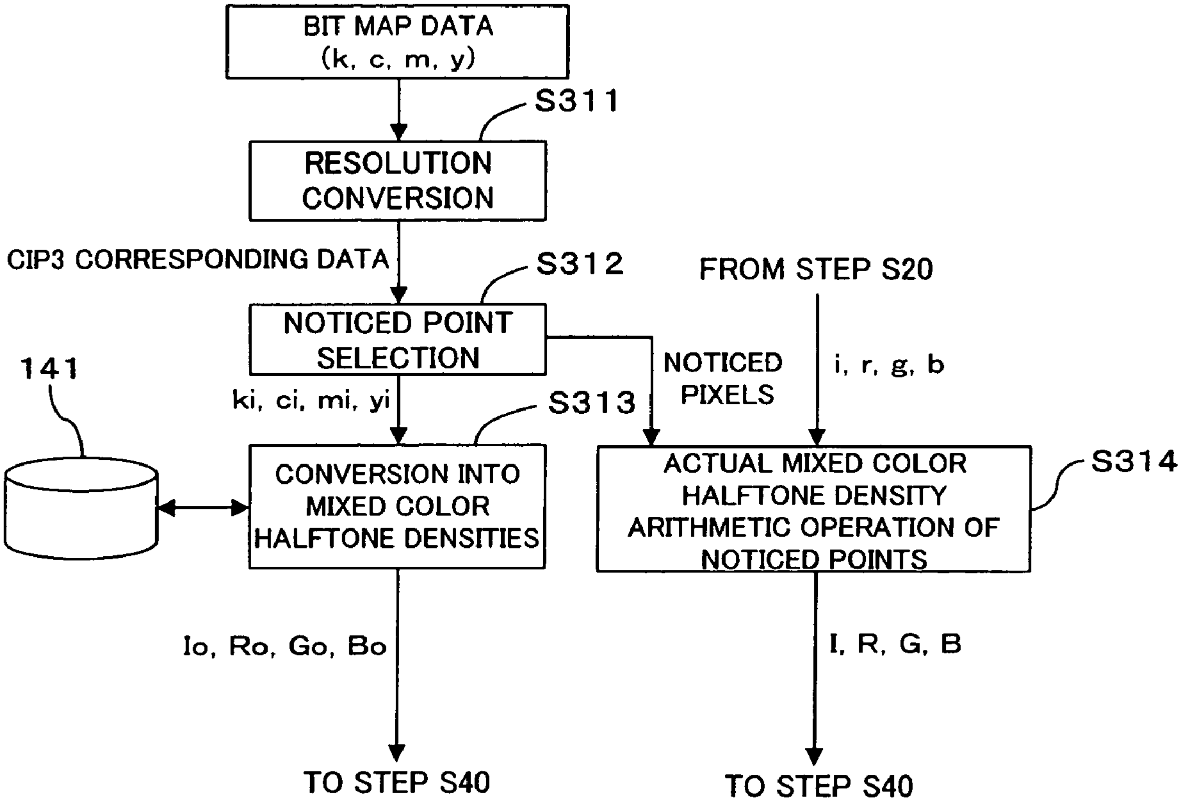
FIG. 7 is a flow chart illustrating a processing flow of color tone control according to a second embodiment of the present invention.

A second embodiment of the present invention is described with reference to FIG. 7. The present embodiment is characterized in a processing method of key zone noticed point density arithmetic operation corresponding to step S31 of FIG. 4, and the flowchart shown in FIG. 7 particularly illustrates the contents of the process in the present embodiment (contents of the process corresponding to step S31 of FIG. 4). Since the contents of the other processes for the picture color tone control are such as described hereinabove with reference to FIG. 6, description of them is omitted here.

In the present embodiment, a case is supposed wherein halftone dot area rate data can be acquired from the outside (for example, the source of the printing request to a printing company, the main office of a newspaper company to a printing factory of the newspaper company, or the like). Here, it is assumed that paper page information for a newspaper is transmitted in the form of bit map data (1-bit Tiff plate making data) from the main office of a newspaper company to a printing factory. Further, at step S311, the bit map data received are converted into low resolution data corresponding to CIP3 PPF data according to a format of the printing press, and the low resolution data are used as pixel area rate data. Although the resolution conversion process is performed in order to achieve common use of the data together with general CIP3 PPF data, it is otherwise possible to use the bit map data themselves as pixel area rate data in a succeeding process.

At step S312, a noticed point corresponding to each ink color is set for each ink supplying unit width. In order to set a noticed point, a method is available wherein a picture image of the newspaper page is displayed on the touch panel 30 using the bit map data received from the main office of the newspaper company and an operator arbitrarily selects a particular point on the newspaper page displayed on the touch panel 30. Also another method is available wherein a pixel which exhibits the highest autocorrelation with regard to the halftone dot area rate is automatically extracted through arithmetic operation from among the pixels for each ink color and is automatically set as a noticed point (noticed pixel). More particularly, for example, the autocorrelation sensitivity Hc of cyan can be represented as "$Hc=c^2/(c+m+y+k)$" using the pixel area rate data (c, m, y, k), and a pixel which exhibits the highest value of the autocorrelation sensitivity Hc is determined as a noticed point of cyan. Similarly, for each of the other ink colors, a pixel having the highest autocorrelation sensitivity is arithmetically operated and set as a noticed point.

At step S313, the conversion table recorded in the database 141 is used to convert the halftone dot area rates ki, ci, mi, yi of the noticed points into mixed color halftone densities and set as target mixed color halftone densities Io, Ro, Go, Bo, respectively. Further, at step S314, the reflection light amounts of the pixels arithmetically operated at step S20 are used to arithmetically operate the actual mixed color halftone densities I, R, G, B of the noticed points. The arithmetic operation method of the actual mixed color halftone densities I, R, G, B is described hereinabove in connection with the first embodiment, and therefore, description of the method is omitted here.

According to the method of the present embodiment, it is possible to accurately perform color tone control for a particular noticed point of a picture from a point of time immediately after printing is started without waiting that an OK sheet is printed. Accordingly, the time required before an OK sheet is obtained can be further reduced to decrease the paper loss. Particularly where a pixel which has the highest autocorrelation with regard to the halftone dot area rate is set as a noticed point from among the pixels for each color, a pixel which exhibits the highest density sensitivity is selected as a noticed point. Consequently, the sensitivity in sensing is enhanced, and therefore, adjustment to a desired color tone can be completed rapidly.

It is to be noted that, at step S312, a pixel group including a plurality of pixels may be selected as a noticed point. For example, if an operator selects an arbitrary pixel or a pixel which exhibits the highest autocorrelation sensitivity is selected automatically, then a pixel group including surrounding pixels is selected as a noticed point. Although the number or the selection pattern of such surrounding pixels to be included in the noticed point may be fixed (for example, adjacent eight pixels surrounding the selected or automatically extracted pixel), preferably they are set so that an influence of disturbance may be suppressed taking the position and so forth of the selected or automatically extracted pixel in the picture into consideration. Then, where a pixel group is set as a noticed point, at step S313, an average mixed color halftone density of the pixel group is set as a target mixed color halftone density, and at step S314, an actual average mixed color halftone density of the pixel group is measured. Since this decreases the variation of measurement data caused by meandering or displacement of the top and bottom of the printing paper, stabilized feedback control can be anticipated.

C. Third Embodiment

Figure 8:
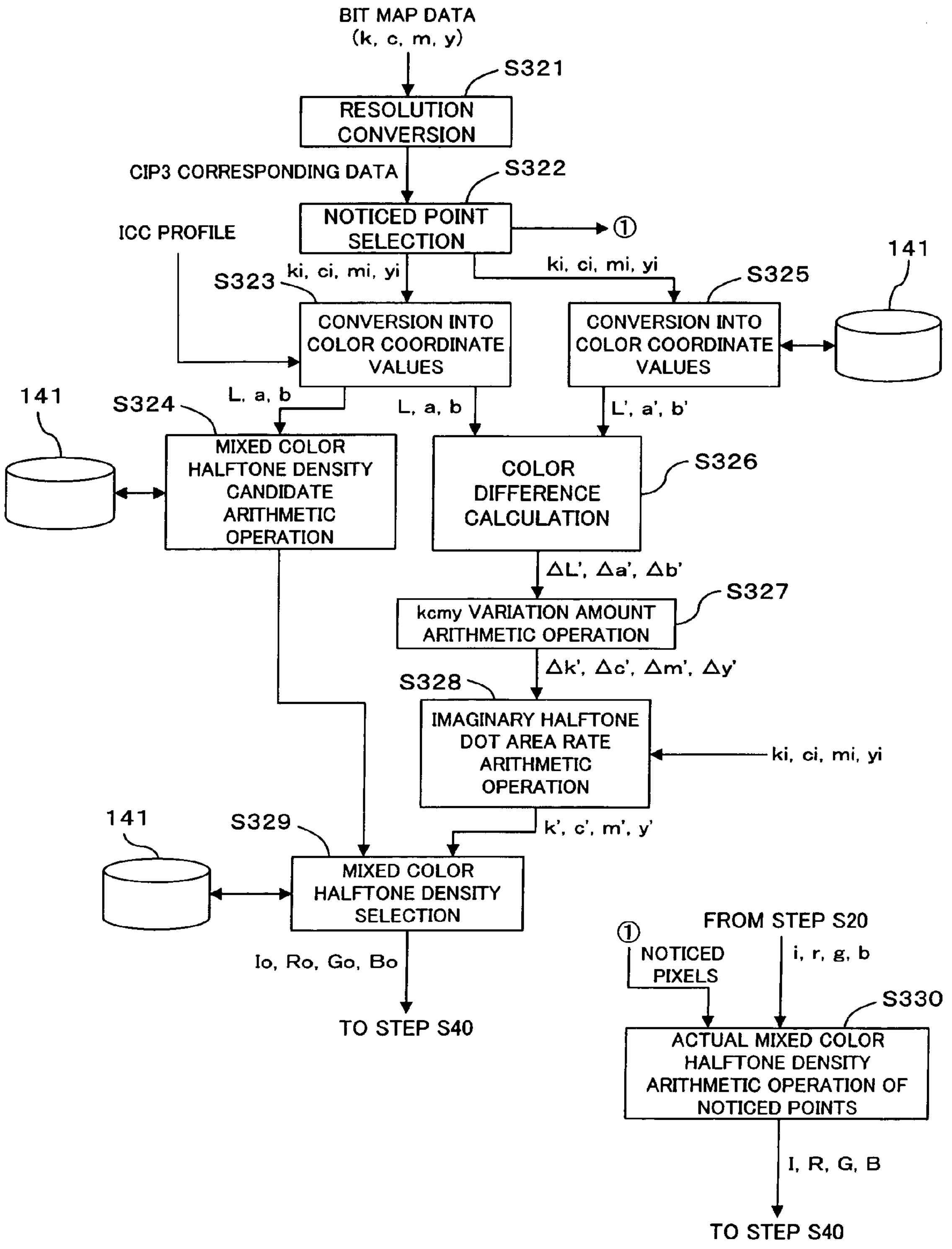
FIG. 8 is a flow chart illustrating a processing flow of color tone control according to a third embodiment of the present invention.

A third embodiment of the present invention is described with reference to FIG. 8. Also the present embodiment is characterized, similarly to the second embodiment, in the processing method of key zone noticed point density arithmetic operation corresponding to step S31 of FIG. 4, and the flow chart shown in FIG. 8 particularly illustrates the contents of the process in the present embodiment (contents of the process corresponding to step S31 of FIG. 4). Since the contents of the other processes for the picture color tone control are such as described hereinabove with reference to FIG. 4, description of them is omitted here.

It is assumed that, also in the present embodiment, paper page information for a newspaper is transmitted in the form of bit map data from the main office of a newspaper company to a printing factory. However, it is assumed that, different from the second embodiment, in the present embodiment, also an ICC profile of an inputting apparatus by which color information of the paper page is transmitted in addition to bit map data of the paper page information. At step S321, the bit map data are converted into low resolution data corresponding to CIP3 PPF data according to a format of the printing press, and at step S322, a noticed point corresponding to each of the ink colors is set for each ink supplying unit width. The contents of the processes at steps S321 and S322 are similar to those at steps S311 and S322, respectively, and therefore, detailed description of them is omitted here.

At step S323, the ICC profile received from the main office of the newspaper company is used to convert halftone dot area rates ki, ci, mi, yi of the noticed points into color coordinate values L, a, b. Then, at step S324, the conversion table stored in the database 141 is used to convert the color coordinate values L, a, b determined at step S323 in to mixed color halftone densities. However, since a mixed color halftone density is four-dimensional information while a color coordinate value is three-dimensional information, a mixed color halftone density corresponding to the color coordinate values is not decided uniquely. Although some additional information is required in order to decide the mixed color halftone density uniquely, only three-dimensional information of the color coordinate value can be obtained from the ICC profile.

Therefore, in the present embodiment, halftone dot area rate data of a printing picture, that is, halftone dot area rates ki, ci, mi, yi corresponding to the color coordinate values L, a, b, are utilized to select the most appropriate piece of four-dimensional information from among a very great number of pieces of four-dimensional information which are regarded as candidates in such expansion from three-dimensional information into four-dimensional information as described in description of steps given below.

In particular, first at step S325, the conversion table stored in the database 141 is used to convert the halftone dot area rates ki, ci, mi, yi of the noticed points into color coordinate values L', a', b'. At step S326, color differences ΔL', Δa', Δb' between the color coordinate values L, a, b determined at step S323 and the color coordinate values L', a', b' determined at step S325 are arithmetically operated. Then at step S327, variation amounts Δk', Δc', Δm' Δy' of the halftone dot area rates corresponding to the color differences ΔL, Δa, Δb are arithmetically operated, respectively. The variation amounts of the halftone dot area rates can be approximated in accordance with the following expressions using the variation amounts of the color coordinate values:

$$\Delta c' = a11\times\Delta L' + a12\times\Delta a' + a13\times\Delta b' + bc \quad (1)$$

$$\Delta m' = a21\times\Delta L' + a22\times\Delta a' + a23\times\Delta b' + bm \quad (2)$$

$$\Delta y' = a31\times\Delta L' + a32\times\Delta a' + a33\times\Delta b' + by \quad (3)$$

$$\Delta k' = a41\times\Delta L' + a42\times\Delta a' + a43\times\Delta b' + bk \quad (4)$$

where a and b are linear approximation coefficients.

At step S328, the variation amounts Δk', Δc', Δm', Δy' determined at step S327 are added to the halftone dot area rates ki, ci, mi, yi of the noticed points, and resulting values are set as imaginary halftone dot area rates k', c', m', y', respectively. At step S329, the imaginary halftone dot area rates k', c', m', y' are collated with the conversion table recorded in the database 141 to select those of the plurality of mixed color halftone density candidates determined at step S324 which correspond most to the imaginary halftone dot area rates k', c', m', y'. The selected mixed color halftone densities are set as the target mixed color halftone densities Io, Ro, Go, Bo and are used in the processes at step S40 et seq. together with the actual mixed color halftone densities I, R, G, B of the noticed points arithmetically operated at step S330.

According to the present method, since the color tone can be controlled using an ICC profile obtained from a printing request source or the like, color adjustment to a color tone requested by the printing request source or the like can be performed more accurately and readily than conventional color adjustment which is performed through comparison with a proof. Accordingly, with the present method, the amount of paper loss before an OK sheet is obtained can be reduced significantly.

D. Fourth Embodiment

A fourth embodiment of the present invention is described with reference to FIG. 9. The present embodiment proposes an auxiliary method for color tone control, and the present method can be applied additionally to the color tone control of any of the first to third embodiments.

Figure 9:
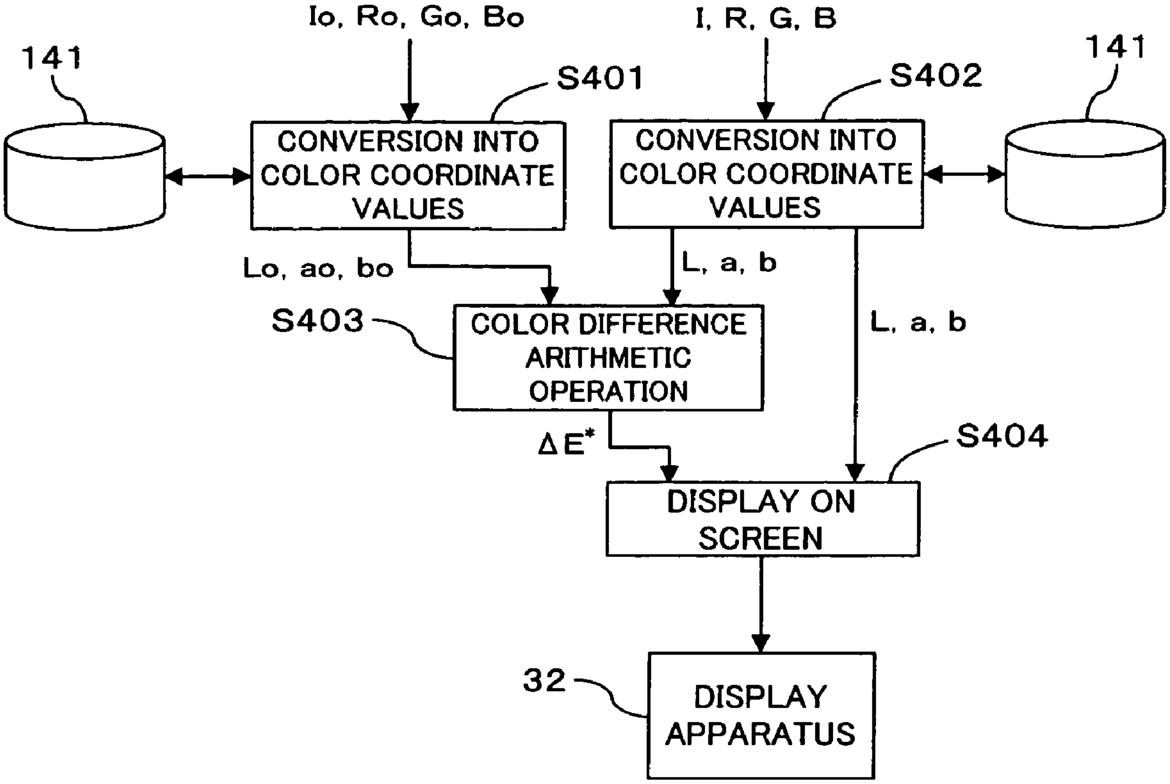
FIG. 9 is a flow chart illustrating a processing flow of color tone control according to a fourth embodiment of the present invention.

Referring to FIG. 9, first at step S401, the conversion table recorded in the database 141 is used to convert target mixed color halftone densities Io, Ro, Go, Bo into color coordinate values. At step S402, the conversion table is used similarly to convert the actual mixed color halftone densities I, R, G, B into color coordinate values. Then at step S403, a color difference $\Delta E^*(=\sqrt{\{(Lo-L)^2+(ao-a)^2+(bo-b)^2\}})$ between the target color coordinate values Lo, ao, bo determined at step S401 and the actual color coordinate values L, a, b determined at step S402 is arithmetically operated, and at step S404, the actual color coordinate values L, a, b and the color difference ΔE* are displayed on a display apparatus 32.

Since the L*a*b* calorimetric system is a colorimetric system wherein coordinates are linear with respect to the color stimulus to the human being, by representing the color of a noticed point with the color coordinate values L, a, b or representing a color difference ΔE* of the color of the noticed point from a target color, it is possible to allow the operator to recognize intuitively by what level the color coincides. Accordingly, by carrying out the present method in addition to the color tone control of any of the first to third embodiments, the decision of the operator can be assisted to achieve more accurate color adjustment.

E. Others

While preferred embodiments of the present invention have been described, the present invention is not limited to the embodiments described above. For example, in the first embodiment described above, it is possible to adopt not only the method which includes provision of the database 141 for coordinating the network dot area rate of each ink color and the mixed color halftone density with each other but also another method wherein the known Neugebauer's expression which defines a corresponding relationship between the halftone dot area rate of each ink color and the mixed color halftone density is stored in advance and the halftone dot area rate of each of the ink colors is applied to the expression to calculate the mixed color halftone density.

Further, not only the method wherein such a map as illustrated in FIG. 6 is used to determine a solid density deviation of each of the ink colors corresponding to the deviation between the target single color halftone density and the actual single color halftone density but also another method wherein the known Yule-Nielsen equation which defines a corresponding relationship among the halftone dot area rate, single color halftone density and solid density is stored in advance and a target halftone dot area rate, an actual halftone dot area rate and a single color halftone density are applied to the expression to calculate a solid density deviation are available.

Further, while, in the embodiments described above, an IRGB densitometer of the line sensor type is used, alternatively an IRGB densitometer of the spot type may be used to scan the printing sheet two-dimensionally.

What is claimed is:

1. A picture color tone controlling method for a printing press, comprising:

a step of setting, when a printing picture is divided with an ink supplying unit width of an ink supplying apparatus, a target mixed color halftone density for each ink supplying unit width;

a step of measuring an actual mixed color halftone density for each ink supplying unit width of a regular printing sheet obtained by printing using an IRGB densitometer;

a step of determining, based on a corresponding relationship between the tone value and the mixed color halftone density set in advance, a target tone value of each ink color corresponding to the target mixed color halftone density;

a step of determining, based on the corresponding relationship between the tone value and the mixed color halftone density, an actual tone value of each ink color corresponding to the actual mixed color density;

a step of determining, based on a corresponding relationship between the tone value and the single color halftone density set in advance, a target single color halftone density corresponding to the target tone value;

a step of determining, based on a corresponding relationship among the tone value, the single color halftone density and the solid density set in advance, a solid density deviation corresponding to a deviation between the target single color halftone density and the actual single color halftone density under the target tone value; and a step of adjusting the ink supplying amount for each ink supplying unit width so that the actual mixed color halftone density may approach the target mixed color halftone density, wherein at the step of adjusting the ink supplying amount, the ink supplying amount is adjusted for each ink supplying unit width based on the solid density deviation to make the actual mixed color halftone density approach the target mixed color halftone density.

2. The picture color tone controlling method for a printing press as claimed in claim 1, wherein, at the step of setting a target mixed color halftone density, a mixed color halftone density corresponding to an image area rate for each ink supplying unit width of each ink color in the current printing picture is determined based on the corresponding relationship between the tone value and the mixed color halftone density, and the mixed color halftone density corresponding to the image area rate is set as the target mixed color halftone density.

3. The picture color tone controlling method for a printing press as claimed in claim 1, wherein, if an OK sheet which satisfies a printing quality is obtained, at the step of setting a target mixed color halftone density, a noticed pixel corresponding to each color is selected for each ink supplying unit width from among pixels which form the picture of the OK sheet and the mixed color halftone density of the noticed pixel is set as the target mixed color halftone density, and at the step of measuring an actual mixed color halftone density, the actual mixed color halftone density of the noticed pixel is measured.

4. The picture color tone controlling method for a printing press as claimed in claim 3, further comprising:

a step of determining an actual color coordinate value corresponding to the actual mixed color halftone density of the noticed pixel measured by the IRGB densitometer based on a corresponding relationship between the mixed color halftone density and the color coordinate value determined in advance;

a step of determining a target color coordinate value corresponding to the target mixed color halftone density based on the corresponding relationship between the mixed color halftone density and the color coordinate value;

a step of determining a color difference between the actual color coordinate value and the target color coordinate value; and a step of displaying the actual color coordinate value and/or the color difference on a display apparatus.

5. The picture color tone controlling methods for a printing press as claimed in claim 3, wherein a pixel which has the highest autocorrelation to the tone value is automatically extracted as the noticed pixel for each ink color.

6. The picture color tone controlling method for a printing press as claimed in claim 3, wherein: a pixel group is automatically extracted as the noticed pixel for each ink color, the pixel group including a pixel which has the highest autocorrelation to the tone value and a plurality of pixels around the pixel; at the step of setting a target mixed color halftone density, an average mixed color halftone density of the pixel group is set as the target mixed color halftone density; and at the step of measuring an actual mixed color halftone density, an actual average mixed color halftone density of the pixel group is measured.

7. The picture color tone controlling method for a printing press as claimed in claim 1, wherein the step of setting a target mixed color halftone density further comprises:

a step of acquiring kcmy tone value data of a printing object picture from the outside; a step of selecting a noticed pixel corresponding to each ink color for each ink supplying unit width from among pixels which from the printing object picture;

a step of converting the tone value of the noticed pixel into a mixed color halftone density based on a corresponding relationship between the tone value and the mixed color halftone density set in advance; and at the step of setting a target mixed color halftone density, the mixed color halftone density of the noticed pixel is set as the target mixed color halftone density, and then at the step of measuring an actual mixed color halftone density, the actual mixed color halftone density of the noticed pixel is measured.

8. The picture color tone controlling method for a printing press as claimed in claim 7, wherein, at the step of acquiring kcmy tone value data, low resolution data corresponding to CIP3 PPF data obtained by conversion of bit map data of a printing object picture acquired first is used as the kcmy tone value data.

9. The picture color tone controlling method for a printing press as claimed in claim 1, wherein the step of setting a target mixed color halftone density further comprises:

a step of acquiring kcmy tone value data and an ICC profile of a printing object picture from the outside;

a step of selecting a noticed pixel corresponding to each ink color for each ink supplying unit width from among pixels which from the printing object picture; and a step of converting the tone value of the noticed pixel into a mixed color halftone density using the ICC profile and a device profile of the IRGB densitometer; and at the step of setting a target mixed color halftone density, the mixed color halftone density of the noticed pixel is set as the target mixed color halftone density, and at the step of measuring an actual mixed color halftone density, the actual mixed color halftone density of the noticed pixel is measured.

10. The picture color tone controlling method for a printing press as claimed in claim 9, wherein the device profile is a conversion table which defines a corresponding relationship among the tone value, the mixed color halftone density and the color coordinate value;

the step of converting the tone value of the noticed pixel into a mixed color halftone density further comprises:

a step of converting the tone value of the noticed pixel into a color coordinate value using the ICC profile;

a step of determining a plurality of mixed color halftone density candidates corresponding to the color coordinate value of the noticed pixel using the conversion table;

a step of converting the tone value of the noticed pixel into a color coordinate value using the conversion table;

a step of determining a color difference between the two color coordinate values obtained by the conversion based on the ICC profile and the conversion based on the conversion table;

a step of arithmetically operating a variation amount of the tone value corresponding to the color difference;

a step of determining an imaginary tone value by adding the variation amount to the tone value of the noticed pixel; and a step of referring to the conversion table to select that one of the plurality of mixed color halftone density candidates which corresponds most to the imaginary tone value; and at the step of converting the tone value of the noticed pixel into a mixed color halftone density, the selected mixed color halftone density candidate is set as the mixed color halftone density of the noticed pixel.

11. The picture color tone controlling method for a printing press as claimed in claim 1, wherein, after the step of setting a target mixed color halftone density, the operation from the step of measuring an actual mixed color halftone density to the step of adjusting the ink supplying amount is executed repetitively in predetermined cycles.

12. A picture color tone controlling apparatus for a printing press, comprising:

target mixed color halftone density setting means for setting a target mixed color halftone density for each ink supplying unit width when a printing picture is divided with the ink supplying unit width;

an IRGB densitometer disposed on a traveling line of a regular printing sheet obtained by printing;

mixed color halftone density measurement means for operating said IRGB densitometer to measure an actual mixed color halftone density for each ink supplying unit width of the regular printing sheet;

target tone value arithmetic operation means for determining, based on a corresponding relationship between the tone value and the mixed color halftone density set in advance, a target tone value of each ink color corresponding to the target mixed color halftone density set by said target mixed color halftone density setting means;

actual tone value arithmetic operation means for determining, based on the corresponding relationship between the tone value and the mixed color halftone density, an actual tone value of each ink color corresponding to the actual mixed color density measured by said mixed color halftone density measurement means;

target single color halftone density arithmetic operation means for determining, based on a corresponding relationship between the tone value and the single color halftone density set in advance, a target single color halftone density corresponding to the target tone value;

actual single color halftone density arithmetic operation means for determining, based on the corresponding relationship between the tone value and the single color halftone density, an actual single color halftone density corresponding to the actual tone value; and solid density deviation arithmetic operation means for determining, based on a corresponding relationship among the tone value, the single color halftone density and the solid density set in advance, a solid density deviation corresponding to a deviation between the target single color halftone density and the actual single color halftone density under the target tone value; and ink supplying amount adjustment means for adjusting the ink supplying amount for each ink supplying unit width so that the actual mixed color halftone density may approach the target mixed color halftone density;

said ink supplying amount adjustment means adjusting the ink supplying amount for each ink supplying unit width based on the solid density deviation to make the actual mixed color halftone density approach the target mixed color halftone density.

13. The picture color tone controlling apparatus for a printing press as claimed in claim 12, further comprising a conversion table which defines a corresponding relationship among the tone value, the mixed color halftone density and the color coordinate value, said target tone value arithmetic operation means and said actual tone value arithmetic operation means using said conversion table to determine the target halftone area rate and the actual tone value, respectively.

14. The picture color tone controlling apparatus for a printing press as claimed in claim 13, further comprising:

reception means for receiving kcmy tone value data of a printing object picture from the outside;

noticed pixel setting means for setting a noticed pixel corresponding to each ink color for each ink supplying unit width from among pixels which from the printing object picture; and conversion means for converting the tone value of the noticed pixel into a mixed color halftone density using said conversion table;

the mixed color halftone density of the noticed pixel being set as the target mixed color halftone density;

said mixed color halftone density measurement means measuring the actual mixed color halftone density of the noticed pixel.

15. The picture color tone controlling apparatus for a printing press as claimed in claim 13, wherein said target mixed color halftone density setting means includes:

reception means for receiving kcmy tone value data and an ICC profile of a printing object picture from the outside;

noticed pixel setting means for setting a noticed pixel corresponding to each ink color for each ink supplying unit width from among pixels which from the printing object picture; and conversion means for converting the tone value of the noticed pixel into a mixed color halftone density using the ICC profile and said conversion table;

the mixed color halftone density of the noticed pixel being set as the target mixed color halftone density;

said mixed color halftone density measurement means measuring the actual mixed color halftone density of the noticed pixel.

16. The picture color tone controlling apparatus for a printing press as claimed in claim 13, further comprising:

actual color coordinate value arithmetic operation means for determining an actual color coordinate value corresponding to the actual mixed color halftone density using said conversion table;

target color coordinate value arithmetic operation means for determining a target color coordinate value corresponding to the target mixed color halftone density using said conversion table;

color difference arithmetic operation means for determining a color difference between the actual color coordinate value and the target color coordinate value; and display means for displaying the actual color coordinate value and/or the color difference on a display apparatus.

17. A picture color tone controlling method for a printing press, comprising:

a step of setting, when a printing picture is divided with an ink supplying unit width of an ink supplying apparatus, a target mixed color halftone density for each ink supplying unit width;

a step of measuring an actual mixed color halftone density for each ink supplying unit width of a regular printing sheet obtained by printing using an IRGB densitometer;

a step of determining, based on a corresponding relationship between the tone value and the mixed color halftone density set in advance, a target tone value of each ink color corresponding to the target mixed color halftone density;

a step of determining, based on the corresponding relationship between the tone value and the mixed color halftone density, an actual tone value of each ink color corresponding to the actual mixed color density;

a step of determining, based on a corresponding relationship between the tone value and the single color halftone density set in advance, a target single color halftone density corresponding to the target tone value;

a step of determining, based on a corresponding relationship among the tone value, the single color halftone density and the solid density set in advance, a solid density deviation corresponding to a deviation between the target single color halftone density and the actual single color halftone density under the target tone value; and a step of adjusting the ink supplying amount for each ink supplying unit width so that the actual mixed color halftone density may approach the target mixed color halftone density, wherein at the step of adjusting the ink supplying amount, the ink supplying amount is adjusted for each ink supplying unit width based on the solid density deviation to make the actual mixed color halftone density approach the target mixed color halftone density;

the step of setting a target mixed color halftone density further comprises:

a step of acquiring kcmy tone value data and an ICC profile of a printing object picture from the outside;

a step of selecting a noticed pixel corresponding to each ink color for each ink supplying unit width from among pixels which from the printing object picture; and a step of converting the tone value of the noticed pixel into a mixed color halftone density using the ICC profile and a device profile of the IRGB densitometer; and at the step of setting a target mixed color halftone density, the mixed color halftone density of the noticed pixel is set as the target mixed color halftone density, and at the step of measuring an actual mixed color halftone density, the actual mixed color halftone density of the noticed pixel is measured;

the device profile is a conversion table which defines a corresponding relationship among the tone value, the mixed color halftone density and the color coordinate value;

the step of converting the tone value of the noticed pixel into a mixed color halftone density further comprises:

a step of converting the tone value of the noticed pixel into a color coordinate value using the ICC profile;

a step of determining a plurality of mixed color halftone density candidates corresponding to the color coordinate value of the noticed pixel using the conversion table;

a step of converting the tone value of the noticed pixel into a color coordinate value using the conversion table;

a step of determining a color difference between the two color coordinate values obtained by the conversion based on the ICC profile and the conversion based on the conversion table;

a step of arithmetically operating a variation amount of the tone value corresponding to the color difference;

a step of determining an imaginary tone value by adding the variation amount to the tone value of the noticed pixel; and a step of referring to the conversion table to select that one of the plurality of mixed color halftone density candidates which corresponds most to the imaginary tone value; and at the step of converting the tone value of the noticed pixel into a mixed color halftone density, the selected mixed color halftone density candidate is set as the mixed color halftone density of the noticed pixel.

18. A picture color tone controlling method for a printing press, comprising:

a step of setting, when a printing picture is divided with an ink supplying unit width of an ink supplying apparatus, a target mixed color halftone density for each ink supplying unit width;

a step of measuring an actual mixed color halftone density for each ink supplying unit width of a regular printing sheet obtained by printing using an IRGB densitometer;

a step of determining, based on a corresponding relationship between the tone value and the mixed color halftone density set in advance, a target tone value of each ink color corresponding to the target mixed color halftone density;

a step of determining, based on the corresponding relationship between the tone value and the mixed color halftone density, an actual tone value of each ink color corresponding to the actual mixed color density;

a step of determining, based on a corresponding relationship between the tone value and the single color halftone density set in advance, a target single color halftone density corresponding to the target tone value;

a step of determining, based on a corresponding relationship among the tone value, the single color halftone density and the solid density set in advance, a solid density deviation corresponding to a deviation between the target single color halftone density and the actual single color halftone density under the target tone value; and a step of adjusting the ink supplying amount for each ink supplying unit width so that the actual mixed color halftone density may approach the target mixed color halftone density, wherein at the step of adjusting the ink supplying amount, the ink supplying amount is adjusted for each ink supplying unit width based on the solid density deviation to make the actual mixed color halftone density approach the target mixed color halftone density;

if an OK sheet which satisfies a printing quality is obtained, at the step of setting a target mixed color halftone density, a noticed pixel corresponding to each color is selected for each ink supplying unit width from among pixels which form the picture of the OK sheet and the mixed color halftone density of the noticed pixel is set as the target mixed color halftone density, and at the step of measuring an actual mixed color halftone density, the actual mixed color halftone density of the noticed pixel is measured; and a pixel which has the highest autocorrelation to the tone value is automatically extracted as the noticed pixel for each ink color.

19. A picture color tone controlling method for a printing press, comprising:

a step of setting, when a printing picture is divided with an ink supplying unit width of an ink supplying apparatus, a target mixed color halftone density for each ink supplying unit width;

a step of measuring an actual mixed color halftone density for each ink supplying unit width of a regular printing sheet obtained by printing using an IRGB densitometer;

a step of determining, based on a corresponding relationship between the tone value and the mixed color halftone density set in advance, a target tone value of each ink color corresponding to the target mixed color halftone density;

a step of determining, based on the corresponding relationship between the tone value and the mixed color halftone density, an actual tone value of each ink color corresponding to the actual mixed color density;

a step of determining, based on a corresponding relationship between the tone value and the single color halftone density set in advance, a target single color halftone density corresponding to the target tone value;

a step of determining, based on a corresponding relationship among the tone value, the single color halftone density and the solid density set in advance, a solid density deviation corresponding to a deviation between the target single color halftone density and the actual single color halftone density under the target tone value; and a step of adjusting the ink supplying amount for each ink supplying unit width so that the actual mixed color halftone density may approach the target mixed color halftone density, wherein at the step of adjusting the ink supplying amount, the ink supplying amount is adjusted for each ink supplying unit width based on the solid density deviation to make the actual mixed color halftone density approach the target mixed color halftone density;

if an OK sheet which satisfies a printing quality is obtained, at the step of setting a target mixed color halftone density, a noticed pixel corresponding to each color is selected for each ink supplying unit width from among pixels which form the picture of the OK sheet and the mixed color halftone density of the noticed pixel is set as the target mixed color halftone density, and at the step of measuring an actual mixed color halftone density, the actual mixed color halftone density of the noticed pixel is measured; and a pixel group is automatically extracted as the noticed pixel for each ink color, the pixel group including a pixel which has the highest autocorrelation to the tone value and a plurality of pixels around the pixel; at the step of setting a target mixed color halftone density, an average mixed color halftone density of the pixel group is set as the target mixed color halftone density; and at the step of measuring an actual mixed color halftone density, an actual average mixed color halftone density of the pixel group is measured.

* * * * *